Sept. 17, 1968  E. JAULMES  3,401,582
AUTOMATIC VARIABLE SPEED TRANSMISSION FOR
AUTOMOTIVE VEHICLES
Filed Dec. 15, 1965  5 Sheets-Sheet 1

INVENTOR
ERIC JAULMES
BY
 KARL RATH
ATTORNEY

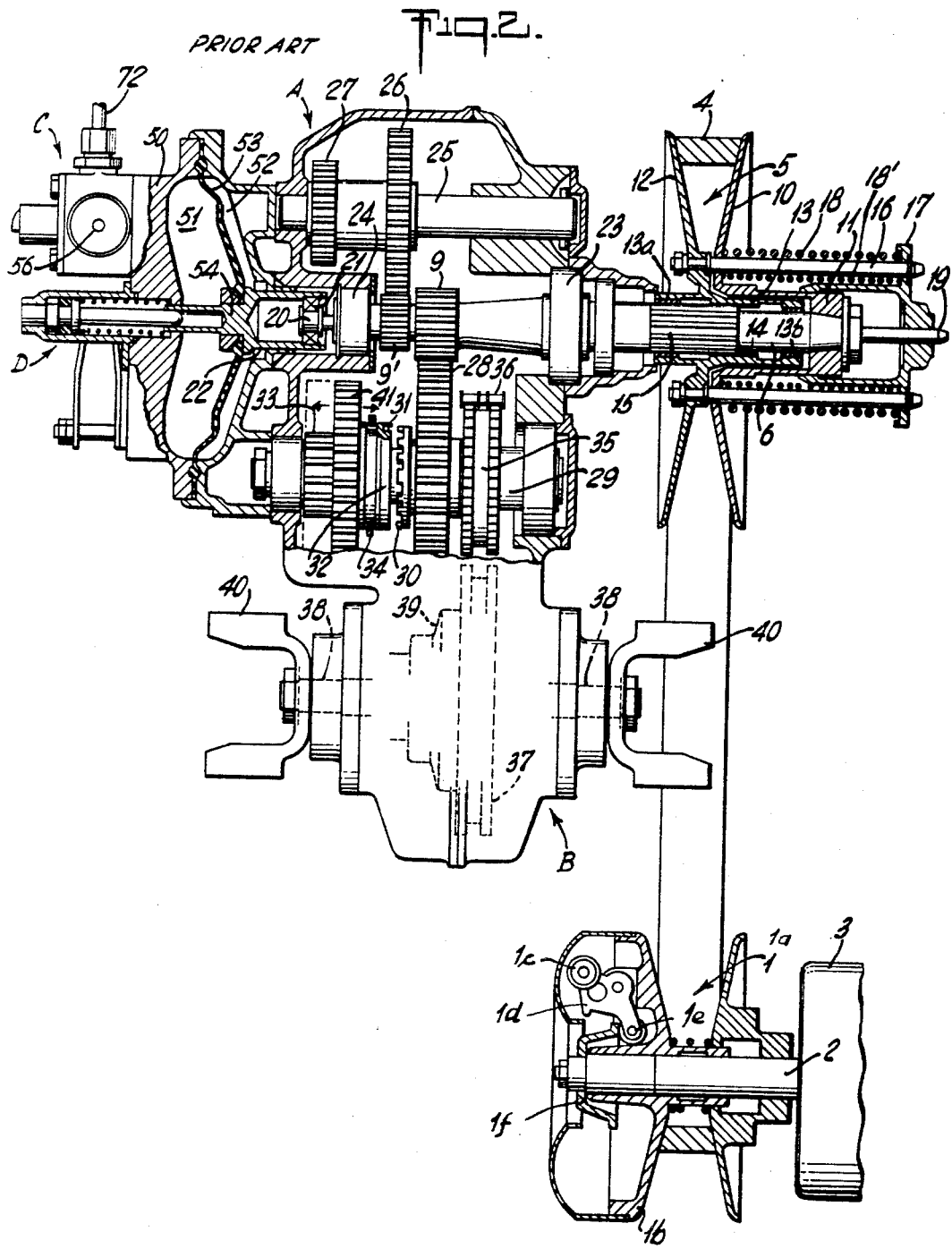

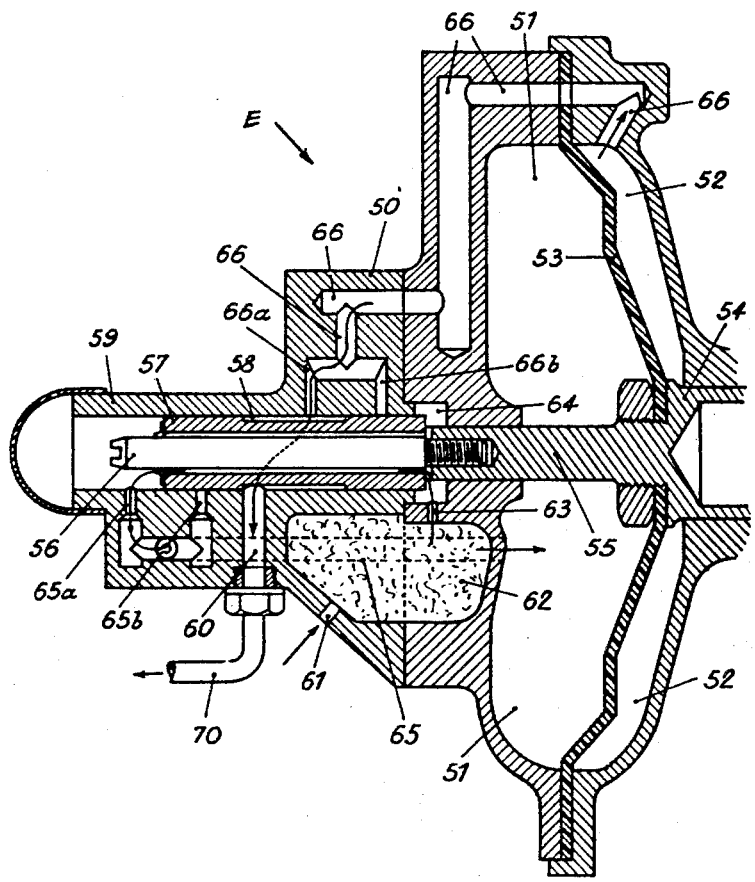

United States Patent Office 3,401,582
Patented Sept. 17, 1968

3,401,582
AUTOMATIC VARIABLE SPEED TRANSMISSION FOR AUTOMOTIVE VEHICLES
Eric Jaulmes, Paris, France, assignor to Ateliers de la Motobecane, a corporation of France
Filed Dec. 15, 1965, Ser. No. 513,997
Claims priority, application France, Dec. 17, 1964, 998,926
8 Claims. (Cl. 74—864)

ABSTRACT OF THE DISCLOSURE

The operating characteristic of a variable speed transmission for automotive vehicles of the type comprising a pair of spring-loaded expansible pulleys interconnected by a trapezoidal belt and functioning by the speed reduction ratio between the driven pulley connected to the vehicle and the driving pulley connected to the engine being reduced gradually during acceleration of the vehicle from a predetermined initial value towards unity or direct drive and, vice versa, during deceleration, respectively, of the vehicle, is automatically controlled by a pneumatic corrector comprising multiple valve means connected with the input conduit of the engine and a diaphragm mounted in a cavity for operation in either direction by the input conduit pressure through said valve means, both said valve means and said diaphragm being operably connected with the displaceable part of the driven pulley, to control the operating characteristic of the transmission upon passing in either direction through a predetermined intermediate position between said initial and unity transmission ratios, to thereby effect an accelerated operation towards direct drive during acceleration and to effect increased engine braking during deceleration, respectively, of the engine.

---

The present invention relates to improvements in automatic transmissions for automotive vehicles, more particularly to transmissions of the general type shown and described, for instance by French Patent No. 1,422,223 and suited especially, though not limitatively, for use in relatively small motor cars or vehicles. Such a transmission is characterized by the fact that it provides the combination of a gear box with a centrifugal variable speed transmission device including two expanding pulleys with interfitted truncated conical flanges and a single trapezoidal belt, the driven pulley, the return spring of which tends to increase its effective diameter, being directly fixed on the input or primary shaft of the gear box of the transmission.

The transmission described by said French patent includes at the same time a pneumatic correcting device effective during manual braking of the vehicle in influencing the range of variation of the ratio of the transmission by adding to or subtracting its action from that of the return spring of the driven pulley in response to the suction created in the intake manifold of the engine of the vehicle. Besides, the transmission described by the French patent includes an additional hydraulic corrector also with manual control at the choice of the driver, the effect of said last corrector being added to that of the pneumatic corrector to give a steeper response curve of the centrifugal variable speed transmission.

The effect of the manifold suction on the variable speed drive in the known transmission is to increase the effective diameter of the driven pulley and in turn the speed transmission ratio between the vehicle and the engine, to result in effective engine braking assisting or relieving the conventional friction brakes.

An object of the present invention is the provision of an improved variable speed transmission of this type by which the referred to engine braking is automatically initiated upon release of the accelerator for stopping the vehicle, or temporary reduction of the speed during normal driving or operation.

Another object of the invention is the provision of fully automatic means operative, upon deceleration of the engine, and with the effective diameter of the expanding driving pulley assuming a predetermined or reference value, in initiating instant and effective engine braking, while urging the transmission towards a condition of "direct drive," or unity transmission ratio during acceleration or increase of the engine speed beyond a value corresponding to said predetermined diameter of said driving pulley, respectively.

The invention, both as to the foregoing and ancillary objects, as well as novel aspects thereof, will be better understood from the following detailed description of a preferred practical embodiment, taken in conjunction with the accompanying drawings forming part of this specification and in which:

FIG. 2 is a view in developed longitudinal section of the transmission according to the afore-mentioned French patent, the position shown corresponding to a high speed reduction ratio obtaining prior to and during starting of the vehicle;

Figure 2A:
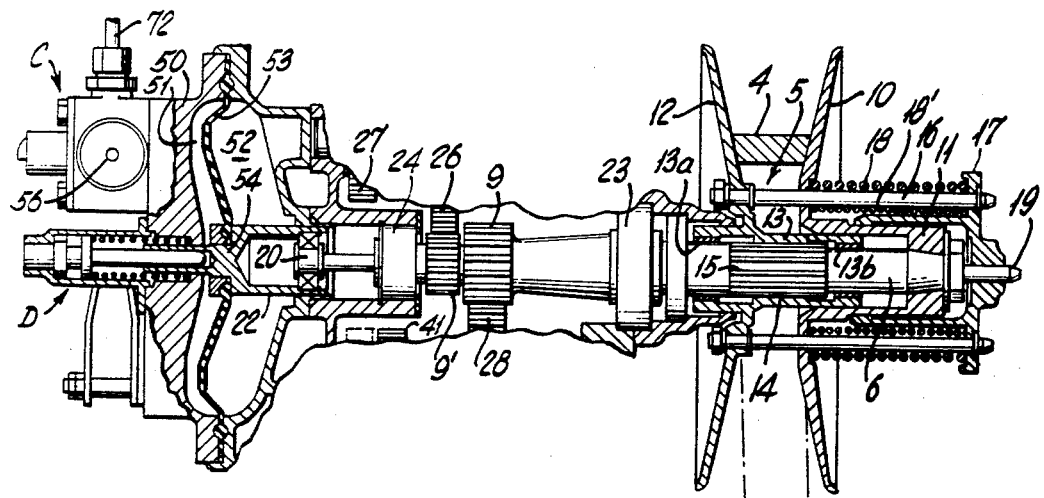
FIG. 2a is a partial view of FIG. 2, showing the transmission in the position near unity speed reduction ratio or direct drive.
Figure 2A:
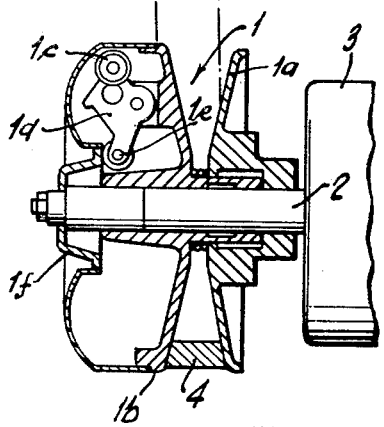
Figure 3:
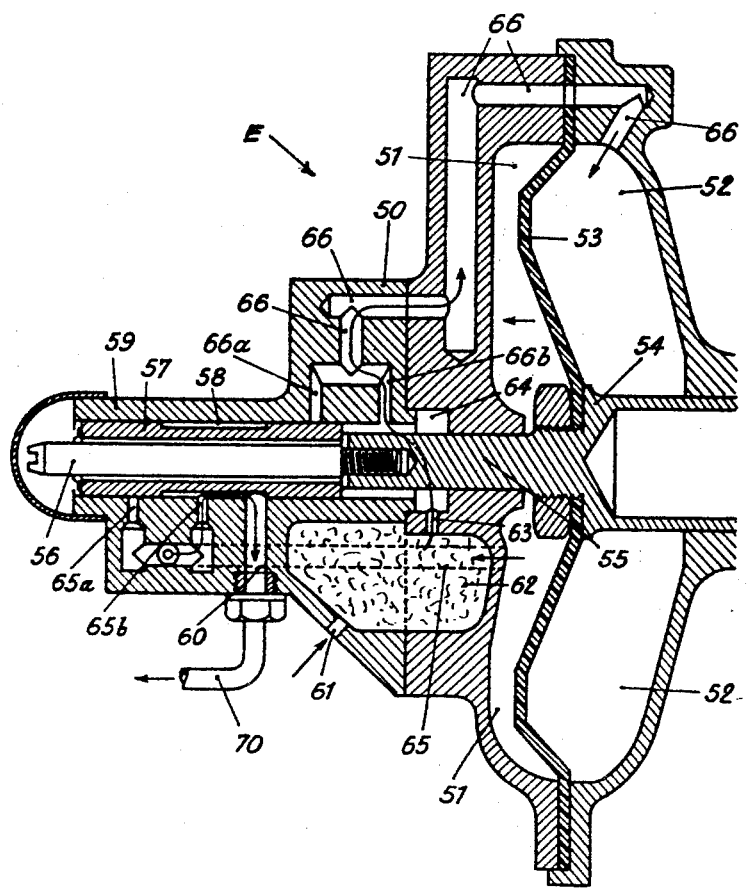

FIG. 3 is a detail view, shown in section and on a larger scale, of the automatic correction device according to the present invention for embodiment in a transmission according to FIGS. 2 and 2a, the parts of the device being shown in the normal or driving condition of the vehicle; and FIG. 4 is a view similar to FIG. 3 and showing the component parts of the device in the rest (idling) condition of the vehicle.

Like reference characters denote like parts or elements in the different view of the drawings.

With the foregoing objects in view, the invention, according to a preferred embodiment, involves generally the provision of a gear box combined with a progressive variable speed device of the type including two expanding pulleys and a trapezoidal belt, one flange of the driven pulley of said device being fitted to a control rod passing through the primary shaft of the gear box on which it is mounted, to connect it to a pneumatic corrector. The latter, being of improved special type, includes a diaphragm on one or the other face of which there acts the pressure in a passage which can be connected, through suitable multiple valve means, to the intake manifold or conduit of the internal combustion engine, according to whether the effective diameter of the expanding driving pulley of the transmission is greater or less than a predetermined or reference diameter, in such a manner that during acceleration beyond this diameter the variable speed drive will be urged in the direction of "direct drive" of the transmission, on the one hand, and that during deceleration below this diameter the reduction ratio of the transmission will be increased to reinforce the engine braking effect, in the manner as will become further apparent as the following description proceeds in reference to the drawings.

Figure 1:
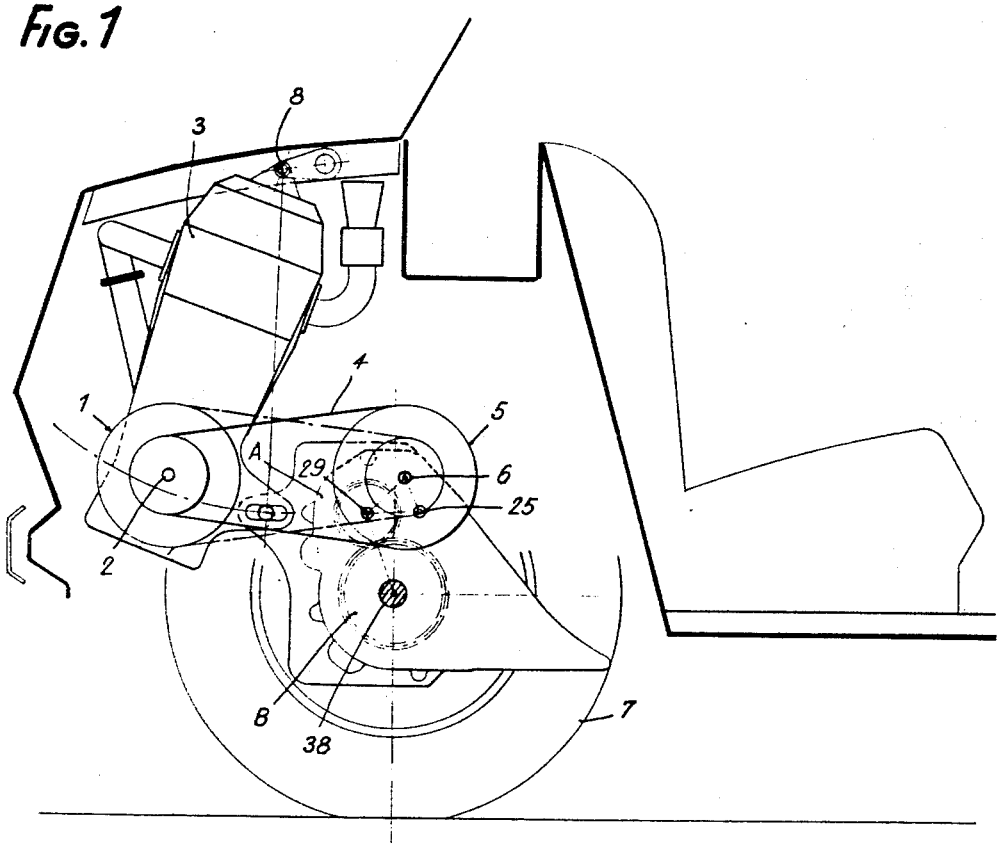
FIG. 1 is a schematic side elevation, shown partly in section, of the rear portion of an automotive vehicle in which are housed the engine and variable speed transmission according to the invention.

Referring more particularly to FIG. 1, the gear box A is combined with a rear axle housing B of the vehicle which latter may include a standard differential. The driving conical expanding pulley 1 of the centrifugal continuously variable speed device of known construction, shown more clearly in FIG. 2, is fixed on the output shaft 2 of the engine 3 and drives directly, through a single trapezoidal belt 4, a driven conical expanding pulley 5 mounted upon the input or primary shaft 6 of the gear box A, the housing of which may be integral with that of the rear axle housing B, as shown in FIG. 2. As shown more clearly by the latter, the rear axle is connected to the wheels 7 of the vehicle through two half-shafts with universal joints, as indicated at 38. The associated rear axle housing B and gear box A are rigidly fixed to the vehicle so as to form part of the sprung portion of the vehicle.

On referring more specifically to FIG. 2, it will be seen that on the input or primary shaft 6 of the gear box A, which carries an input pinion 9 for forward drive and a further pinion 9' for rearward drive, there is mounted the driven expanding pulley 5 which includes an outer truncated conical flange 10 fixed axially and secured to the shaft 6 by a hub 11 having a conical bore, and an inner truncated conical flange 12 which is axially movable by its hub 13 including flutes 14 cooperating with corresponding flutes 15 on the shaft 6, whereby to render the flange 12 fixed as regards rotation with the shaft 6, while at the same time permitting its axial displacement. The steadiness of the movable flange 12 in its axial displacement is properly ensured by the relatively great length given to the hub 13 to the two ends of which are fixed bearing sleeves 13a and 13b sliding on the shaft 6.

Rods 16 pass through the fixed flange 10, these rods being fixed at one of their ends to the movable flange 12 and at their other ends to a terminal sleeve 17 sliding on the hub 11 of the fixed flange 10. A compressed coil spring 18 is interposed between the fixed flange 10 and the sleeve 17, thus constantly tending to bring the two flanges 10 and 12 of the expanding pulley 5 together, or to increase its effective diameter in cooperation with belt 4.

While a single control or return spring 18 may be provided in the driven expanding pulley of the transmission, two such springs 18 and 18' may be employed, as shown in the drawing, disposed one on the outside of and the other within the rods 16, the design of said springs varying (as to wire diameter, etc.) such as to produce a desired non-linear response characteristic of the transmission, to suit existing operatiing conditions and requirements.

The sleeve 17 is pinned or otherwise secured to the end of an axial control rod 19 turning and sliding in the interior of the shaft 6 which for this purpose of hollow construction. At it opposite end, the rod 19 forms a head 20 on which is mounted a ball bearing 21, the outer race of which is fixed in the hub 22 of a diaphragm corrector indicated collectively at C in the drawing.

The primary shaft 6 is supported, in the example shown, by a ball bearing 23, on the one hand, and by a needle bearing 24, on the other hand. In the gear box A there turns a rearward drive shaft 25 carrying a large pinion 26 and a small pinion 27. The large pinion 26 engages permanently with the rearward drive pinion 9' on the shaft 6, while the forward drive pinion 9 engages permanently with a gear wheel 28 turning freely on a secondary shaft 29 mounted within the gear box A. The hub of gear wheel 28 carries dogs 30 which can be operated into engagement with corresponding dogs 31 of a sleeve 32 sliding on flutes 33 of the shaft 29, said sleeve being controlled by a fork 34 actuated by the driver via an appropriate connecting rod or the like mechanism (not shown).

At the opposite end of the secondary shaft 29 the latter carries a chain wheel 35, constructed preferably with multiple teeth with which engages a driving chain 36, to drive the crown wheel 37 of the differential the casing of which is indicated at 39 and the construction of which may be standard. It has already been pointed out that the differential, mounted in the rear axle housing B, serves to drive the two half-shafts 38 connected to the wheels 7 of the vehicle through universal joints 40 in accordance with conventional practice.

The sliding sleeve 32 carries a gear wheel 41 fixed thereto and capable, under the control of the fork 34, of being displaced, as indicated by arrows in the drawing, either to the right so as to be positioned for rotation with the gear wheel 28 by way of the dogs 30, 31, thus producing forward movement of the vehicle, or towards the left so that the gear wheel 41 is operated into engagement, by way of a reversing gear (not shown), with the small rearward drive pinion 27 (position indicated in broken lines in the drawing). The sleeve 32 may also be moved to an intermediate position where it is neither in engagement with the gear wheel 28 nor with the pinion 27, thus isolating the rear axle from the gear box A (neutral position of the transmission).

Referring more specifically to the automatic variable speed drive, the latter comprises the expanding driven pulley 5 on the input shaft 6 of the gear box A and the expanding driving pulley 1 on the engine shaft 2, both said pulleys being aligned with one another and operatively connected by the trapezoidal belt 4.

More specifically, the driving pulley 1 comprises a first concal flange 1a fixedly secured to the engine shaft 2 and a second expanding conical flange 1b slidably mounted upon said shaft with an expansion spring being interposed between said flanges as shown. Mounted upon the outer end of double-lever carrier member 1d, pivoted to the expanding flange 1b, are centrifugal weights 1c, while the opposite end 1e of said member engages an abutment 1f fast on the shaft 2.

During the operation of the variable speed drive, well known per se, as the speed of the engine 3 increases during acceleration of the vehicle, the weights 1c are deflected radially outwardly, whereby to gradually increase the effective diameter of engagement of the pulley 1 with the belt 4. With the belt 4 having a fixed or constant length, the increased engaging diameter with the pulley 1 results in a corresponding decrease of the engaging diameter with the driven pulley 5 whereby to change from an initially relatively large diameter, as shown in FIG. 2, or high reduction ratio between the pulleys 1 and 5, to a smaller diameter, as shown in FIG. 2a, or to cause a continuous decrease of the reduction ratio between the engine and the vehicle as the latter is accelerated from rest to direct drive or normal operating speed.

According to the construction of the referred to French patent, as shown by FIG. 2, the corrector C comprises essentially a casing 50 the interior cavity of which is divided into two chambers 51 and 52 by the provision of a flexible diaphragm 53 mounted by its outer edges being clamped between the flanges of the two halves constituting the casing 50. The central portion of the diaphragm 53 is secured to a sleeve 54, movable axially relative to the housing 50, and connected to the control rod via the race 21 of bearing 20, appropriate means being provided to hermetically seal the casing 50. The diaphragh 53 is operated by suction applied to the interior of the casing 50 from the engine manifold via a line or conduit 72 and a multiple valve 56 controlled in unison with the conventional brake pedal of the engine (not shown), in such a manner as to reinforce the manual braking effect by increased engine braking through operation, via control rod 19, of the slidable flange 12 of the transmission to assist the action of the springs 18 and 18' in increasing the effective engaging diameter of the belt 4 with the pulley 5. Besides, a manual control D permits to modify the transmission operating curve, in a manner not being of interest here and described in greater detail in the referred to French patent.

According to the present invention, the two manually operated correctors C and D of the French patent, FIGS. 2 and 2a, are eliminated and replaced by the improved automatic single corrector E as shown by FIGS. 3 and 4 of the drawings. In the latter, the sleeve 54 includes an extension 55 in which is threaded an axial guide 56 on which is engaged an exchangeable sleeve 57 acting as a distributor slider or valve control member. For this purpose, the sleeve 57 includes an external groove 58. The sleeve 57 being thus fixed to the sleeve 54, slides in a stationary sleeve 59 when, as the effective diameter of the expanding driven pulley 5 varies, its movable flange 12 shifts axially. As a consequence, the position of the slider 57 in the sleeve 59 is directly related at each moment to the effective diameter of the driven expanding pulley 5 of the transmission.

In the housing 50 of the corrector E there are formed the following valve passages: a passage 60 which a line 70 puts into communication with the inlet conduit or manifold of the engine where suction occurs, an opening 61 putting into communication with the atmosphere a chamber formed in the housing 50 and filled with a body 62 of a suitable filtering material, an opening 63 putting the last-mentioned chamber into communication with an internal bore 64 of the housing 50, a passage 65 putting the chamber 51 of the corrector into communication with said bore, the passage 65 terminating in two openings 65a and 65b axially spaced relatively to one another and opening into the groove 58 of the slide 57, and finally a passage 66 putting the chamber 52 of the corrector into communication with the bore 64 of the sleeve 59, this passage also terminating in two openings 66a and 66b axially displaced relatively to one another and likewise opening into the bore of the sleeve 59.

The operation of the automatic correcting device described and shown by FIGS. 3 and 4 is as follows:

With the vehicle travelling at normal speed, that is, with the accelerator pedal held at any point of its travel, the effective diameter of the driven pulley 5 will be in the neighborhood of its lowest value or position, that is, the vehicle travels with a reduced reduction ratio of the transmission, the latter thus functioning under conditions resembling "direct drive." The movable flange 12 thus occupies a position near to its limit of travel towards the left in FIG. 2 and, in consequence, the slider 57 occupies in the valve sleeve 59, FIG. 3, a position near its extreme left position. In this position, the relatively slight suction in the intake conduit of the engine is transmitted to the chamber 51 of the corrector via the route 70, 60, 58, 65b and 65, its action indicated by the arrow in FIG. 3, thus subtracting from that exerted by the return springs 18, 18' of the driven expanding pulley 5, whereby the movable flange 12 is further urged towards the left, the transmission thus tending further towards "direct drive." This corresponds to the normal travel or cruising of the vehicle, for example at speeds above 25 km. p.h.

If now the accelerator pedal is released and, in consequence, the vehicle slows down, the action of the centrifugal variable speed drive is such that the effective diameter of the driven pulley 5 increases, this action being brought about by a displacement of the movable flange 12 towards the right in FIG. 2a, this movement being followed by the slider 57 which will block the openings 65b and 66b but will uncover the openings 65a and 66a, as shown in FIG. 4, the passage 60 remaining uncovered. Thus, for a certain effective diameter of the pulley 5, the suction of the engine, now increased, will act strongly at the opposite face of the diaphragm 53, that is to say in the chamber 52, by the following route: inlet 70, passage 60, groove 58, opening 66a and passage 66. As a consequence, in this case, the action of the suction of the intake conduit will be added to that of the springs 18, 18' in such a way that the movable flange 12 of the expanding pulley 12 will be sharply urged towards the right, whereby this driven pulley now becomes driving, or tending to drive the engine at greater speed, thereby improving the engine braking effect. At the same time, the outside air is drawn into the chamber 51 of the corrector along the route 65a, 65. In the same manner the outside air is drawn into chamber 52 in the FIG. 3 position through body 62 and route 63, 64, 66b and 66.

Any pumping effect in the device is avoided by the placing into communication with the atmosphere of the chamber 64 via the filtering material 62. The latter may be in the form of a porous plastic, such as polyurethane, and acts to filter the air sucked in through the opening 61 as a result of the displacement of the diaphragm 53, thus avoiding clogging of the mechanism by dirt of other foreign particles.

From the foregoing it will be seen that, independently of the braking properly so-called, every reduction of the speed of operation of the engine, appearing in an increase in the suction in the intake manifold, will act to produce the effect of engine braking, without any particular intervention on the part of the driver, on the other hand, while acceleration of the vehicle will automatically influence the progressive variable speed device of the transmission in the direction of "direct drive," on the other hand. This result, which is very favorable to the good and efficient operation of the vehicle and to its operating safety, is obtained, as will be observed, thanks to a mechanism which is both simple and not difficult in construction, readily replacing the corrector C and D of the transmission according to the referred to French patent.

In the device according to the present invention, the suction in the intake manifold of the engine acts permanently on the corrector E, that is, either on one side or the other of the diaphragm 53, according to whether the effective diameter of the driving pulley 5 is greater or less than a predetermined or reference diameter, or corresponding speed reduction ratio. In other words, the corector influences the variable speed device either in one direction or the other, but to a different extent, and producing a different effect, according to whether the speed of the vehicle is greater or less than the predetermined reference speed.

According to an improved feature of the invention, the slider 57 is mounted interchangeably on its guide 56, thus permitting one, upon replacing it by another slider of which the external groove 58 is of different length, to modify the regulation of the device, that is, in fact the speed for reversal of its direction of action on the centrifugal variable speed device.

In brief, there is provided by the invention a variable speed transmission for automotive vehicles operative in automatically and progressively reducing an initially relatively high speed reduction ratio between the engine and vehicle (low gear) as the vehicle is accelerated from rest or idling to normal operating speed, said transmission including further and fully automatic means responsive to the vehicle speed and intake manifold suction, to provide the plural action of urging the transmission towards direct drive upon the speed increasing beyond a predetermined or reference speed, on the one hand, and to substantially and effectively decelerate the vehicle by engine braking upon the vehicle speed decreasing below said predetermined speed, on the other hand.

In the foregoing the invention has been described in reference to a specific illustrative device. It will be evident, however, that variations and modifications, as well as the substitution of equivalent parts and elements for those shown herein for illustration, may be made in accordance with the broader scope and spirit of the invention as set forth in the appended claims. The specification and drawings are accordingly to be regarded in an illustrative rather than in a restrictive sense.

I claim:

1. An automatic transmission for automotive vehicles, having an internal combustion engine including an accelerator and an intake conduit, comprising in combination:

(1) two expansible pulleys, namely, a driving pulley and a driven pulley connected, respectively, to said engine and vehicle and interconnected by a V-belt, (2) each of said pulleys having a first flange fixed to its respective shaft, a second flange axially displaceable on said shaft, and return spring means between said first and second flanges, (3) means including control means responsive to the engine operating condtions for adjusting said driving pulley, to gradually change from an initial relatively high speed reduction ratio between said engine and said vehicle towards unity transmission ratio or direct drive, as the vehicle is accelerated from starting position to direct drive by depressing said accelerator and, vice versa, as the vehicle is decelerated upon release of said accelerator, and (4) a correcting device comprising:

(a) a cavity including a flexible diaphragm dividing the same into a pair of control chambers, (b) coupling means connecting said diaphragm with the displaceable flange of said driven pulley, (c) means including multiple valve means to selectively apply suction from said intake conduit to said chambers, and (d) further coupling means connecting the displaceable flange of said driven pulley with said valve means, to apply suction to one of said chambers during the range of the effective diameters of said driven pulley being above a predetermined intermediate diameter between the starting and direct drive positions thereof, and to apply suction to the other of said chambers during the range of effective diameters of said driven pulley being below said predetermined diameter, (5) said valve and further coupling means being mutually related, to cause pneumatic pressure by said diaphragm to be applied to the displaceable flange of the driven pulley such as to add to the force of the return spring means thereof in its positions above said predetermined diameter and to subtract from said force in its positions below said predetermined diameter, respectively.

2. In an automatic transmission as claimed in claim 1, including a constant speed transmission device interposed between said engine and said vehicle in series with said variable speed transmission device.

3. In an automatic transmission as claimed in claim 1, including a reversible gear box having an input shaft supporting said driving pulley and an output shaft in driving connection with said vehicle.

4. In an automatic transmission as claimed in claim 3, wherein said input shaft is a hollow shaft and said coupling means includes a control rod passing through said input shaft, said rod being connected at one end to said displaceable flange and having its opposite end connected to said diaphragm valve means.

5. In an automatic transmission as claimed in claim 3, wherein said input shaft is a hollow shaft and said coupling means includes a control rod passing through said input shaft, said rod being connected at one end to said displaceable flange and having its opposite end affixed to said diaphragm, said valve means including a movable cylindrical valve member fast on said rod and having an external peripheral groove, a stationary valve sleeve having a bore slidably supporting said movable valve member, and a pair of valve passage means in operative relation to said groove and connecting said intake conduit with said chambers, respectively.

6. In an automatic transmission as claimed in claim 3, wherein said input shaft is a hollow shaft and said coupling means includes a control rod passing through said shaft, said rod being connected at one end to said displaceable flange and having its opposite end affixed to said diaphragm, said valve means including a movable cylindrical valve member fast on said rod and having an external peripheral groove, a stationary valve sleeve having a bore slidably supporting said movable valve member, a pair of valve passage means in operative relation to said groove and connecting said intake conduit with said chambers, respectively, said valve passage means being each subdivided at their ends opposite to said chambers into two passageways terminating into the bore of said sleeve, one or the other of said passageways being covered by said member according to whether the latter occupies one or the other of its extreme operating positions.

7. In an automatic transmission as claimed in claim 5, wherein is provided a path for the outside air entering into the chamber opposite to that to which suction is applied, and a further chamber inserted in said path and provided with a body of filtering material.

8. In an automatic transmission as claimed in claim 5, in which said movable valve member is mounted interchangeably, to permit of the use of valve members having external grooves of different length, to thereby vary the effective reference diameter of said correcting device.

References Cited

FOREIGN PATENTS 1,422,223   12/1965   France.

FRED C. MATTERN, JR., *Primary Examiner.*

H. S. LAYTON, *Assistant Examiner.*